(12) United States Patent
Fränkle

(10) Patent No.: US 6,398,836 B1
(45) Date of Patent: Jun. 4, 2002

(54) POROUS FOLDED FILTER DEVICE FOR FILTERING A FLUID CONTAMINATED WITH PARTICLES

(75) Inventor: Gerhard Fränkle, Remshalden-Grunbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/605,257

(22) Filed: Jun. 28, 2000

(30) Foreign Application Priority Data

Jul. 7, 1999 (DE) .......................................... 199 31 307

(51) Int. Cl.$^7$ ........................ B01D 39/20; B01D 27/06; B01D 27/14
(52) U.S. Cl. .............................. 55/484; 55/492; 55/498; 55/500; 55/521; 55/523; 55/DIG. 30
(58) Field of Search .......................... 55/525, 523, 492, 55/498, 500, 521, 385.3, 484, 482, DIG. 30

(56) References Cited

U.S. PATENT DOCUMENTS

| 2,926,743 A | | 3/1960 | Melchior |
| 3,561,604 A | * | 2/1971 | Yotsumoto ................ 210/484 |
| 3,633,343 A | | 1/1972 | Mark |
| 4,390,354 A | * | 6/1983 | Witchell ..................... 55/337 |
| 4,687,579 A | * | 8/1987 | Bergman .................... 210/347 |
| 5,112,372 A | * | 5/1992 | Boeckermann et al. ....... 55/498 |
| 5,611,831 A | * | 3/1997 | Matsuoka et al. ............ 55/486 |
| 5,919,279 A | * | 7/1999 | Merritt et al. ............. 55/385.3 |

FOREIGN PATENT DOCUMENTS

| DE | 3337902 | 5/1985 |
| DE | 42 07 023 C2 | 9/1993 |
| EP | 0558917 | 9/1993 |
| EP | 0742352 | 11/1996 |
| EP | 0764455 | 3/1997 |

OTHER PUBLICATIONS

Copy of Search Report.

* cited by examiner

Primary Examiner—Robert A. Hopkins
(74) Attorney, Agent, or Firm—Crowell & Moring LLP

(57) ABSTRACT

A device serves for filtering a fluid contaminated with particles, in particular an exhaust gas transporting particulate matter from an engine. The device is provided with an outer container and at least one filter device of a porous material. The porous material of each of the at least one filter devices has a number of folds extending in the direction of flow. Furthermore, the porous material has in its cross section a closed geometrical form with at least one inner opening.

22 Claims, 3 Drawing Sheets

POROUS FOLDED FILTER DEVICE FOR FILTERING A FLUID CONTAMINATED WITH PARTICLES

BACKGROUND OF THE INVENTION

1. Technical Field

The present invention relates to a device for filtering a fluid contaminated with particles. More specifically, but without restriction to the particular embodiment and/or use which is shown and described for purposes of illustration, the present invention relates to a device for filtering a fluid contaminated with particles used on an exhaust gas transporting particulate matter from an engine.

2. Discussion

Filter devices of porous materials are generally known, these filter devices usually being arranged in an outside container. Serving here as the material for the filter devices is generally a porous material which may be, for example, a sintered material composed of metallic materials or else of glass or plastics.

Particularly when they are intended as particulate filters for engine exhaust systems, the filter devices are usually made up of filter plates of the porous material mentioned above lying one behind the other in an outer container.

When the filter devices are used as a particulate filter for the exhaust gases of an engine, the filter device and silencer in the exhaust line of the engine are often combined to form one unit.

With this customary construction of the filter stems, the fluid to be filtered must penetrate one or more layers of the porous material to achieve an adequate cleaning effect. Due to the large surface areas of porous material required, this results in multi-layered filters which oppose the flowing fluid with a very high flow resistance.

Alternatives to this are to produce the particle filters from metal meshes or roughened aluminium-oxide yarn.

U.S. Pat. No. 2,926,743 discloses a free-flow silencer for an exhaust system which comprises two tube elements lying one inside the other, the inner one of the tube elements having a cross-sectionally star-shaped form, which opens out into the outer tube with a terminating element in the manner of a Venturi nozzle. This free-flow silencer is capable of cooling the exhaust gases, reducing their flow velocity and effectively avoiding their pressure fluctuations. As a result, very efficient cooling and silencing of the exhaust gases in the exhaust system is achieved.

SUMMARY OF THE INVENTION

Accordingly, it is the object of the invention to provide a device for filtering a fluid contaminated with particles, in particular an exhaust gas transporting particulate matter from an engine, which device has a large surface area of porous filter material, with ideal space utilization in a prescribed outer container, and which also helps to reduce sound waves and pressure fluctuations in the fluid.

The actual filter unit in the outer container is formed according to the invention by a porous material that extends in the direction of flow being repeatedly folded along this direction of flow and joined together by the free ends, so as to produce a cross-sectionally closed geometrical form which has at least one inner opening. The material may thus be folded, for example, in the manner of a multi-pointed star, so that a kind of tube with a star-shaped cross section is produced from the porous material.

The fluid to be filtered then penetrates this star-like structure from inside to outside or from outside to inside, by the fluid either being introduced into the porous material and flowing from there into the region of the outer container or by the fluid being allowed into the outer container and then drawn out of the least one internal opening in the cross section of the porous material.

The folds make it possible, according to their number, to accommodate a quantity of surface area that is adapted in the best way possible to requirements, or is as great as possible, in the outer container, the geometrical dimensions of which are usually prescribed.

The fact that only the number and form of the folds has to be changed allows the respectively required filter device to be produced from an endless strip of the porous material. Since this device is usually produced by numerically controlled machines, it is sufficient here to store for the respectively required filter device a slightly amended control program, which can produce the filter device adapted to the respective requirements from the same material in each case, without necessitating great readjustments on the machine.

In a particularly favourable embodiment of the invention, the outer container with the filter device serves not only for filtering an exhaust gas contaminated with particles but at the same time as a silencer. This means that any pressure waves there may be in the exhaust gases are reduced by the unit comprising the outer container and filter device, so that no disturbing noises can be emitted to the area surrounding the system. The great porous surface area is also almost ideal for this, since it makes possible corresponding acoustic effects which allow the sound waves in the exhaust gas to "run their course".

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be read in conjunction therewith, and like reference numerals are employed to designate identical components in various views.

DESCRIPTION OF THE PREFERRED EMBODIMENT

A device for filtering a fluid contaminated with particles is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
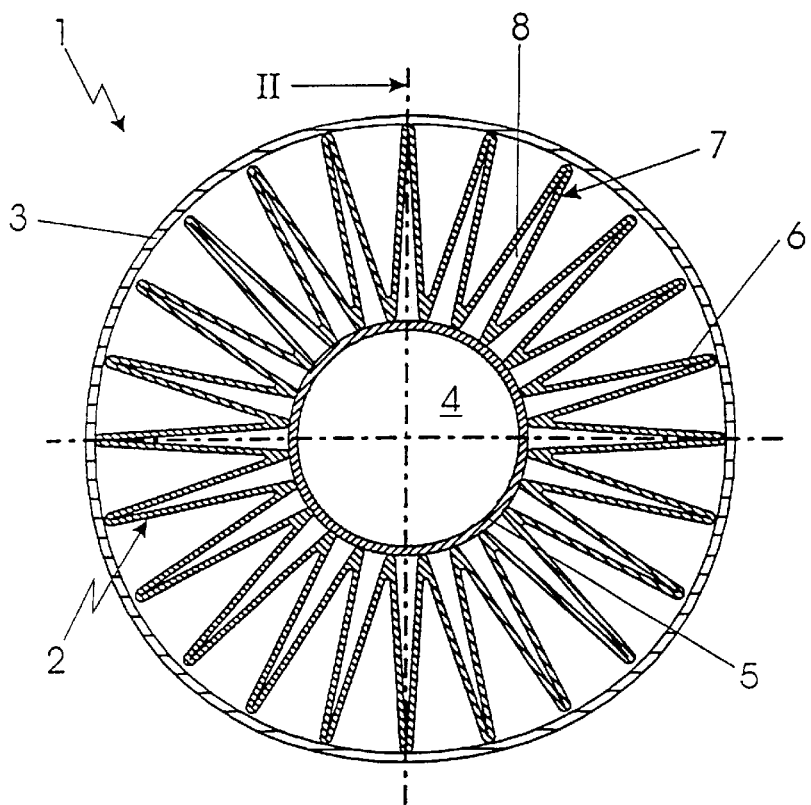
FIG. 1 shows a basic representation of a cross section through the device according to the invention.

FIG. 1 shows a cross section through an embodiment of a device 1 for filtering a fluid laden with particles, or a particle filter 1. In the preferred embodiment, the filter device 2 is arranged in an outer container 3. The filter device 2 includes a plurality of folds extending in the direction of the gas flow. The cross section of the filter device has a closed geometric form that includes an inner opening 4. An inner tube 5 is provided to act as a supporting structure.

The inner tube or supporting structure 5 serves for stabilizing the filter device 2, which consists of a porous material 6 or sintered material 6 and is divided by numerous folds into a multiplicity of tine-like subregions 7. The inner tube 5 is formed in the region extending in the interior of the filter device 2 from a perforated material or grid-like material (cannot be seen in the representation) or at least has openings which join the inner opening 4 to the inner spaces 8 of the tine-like subregions 7.

Figure 2:
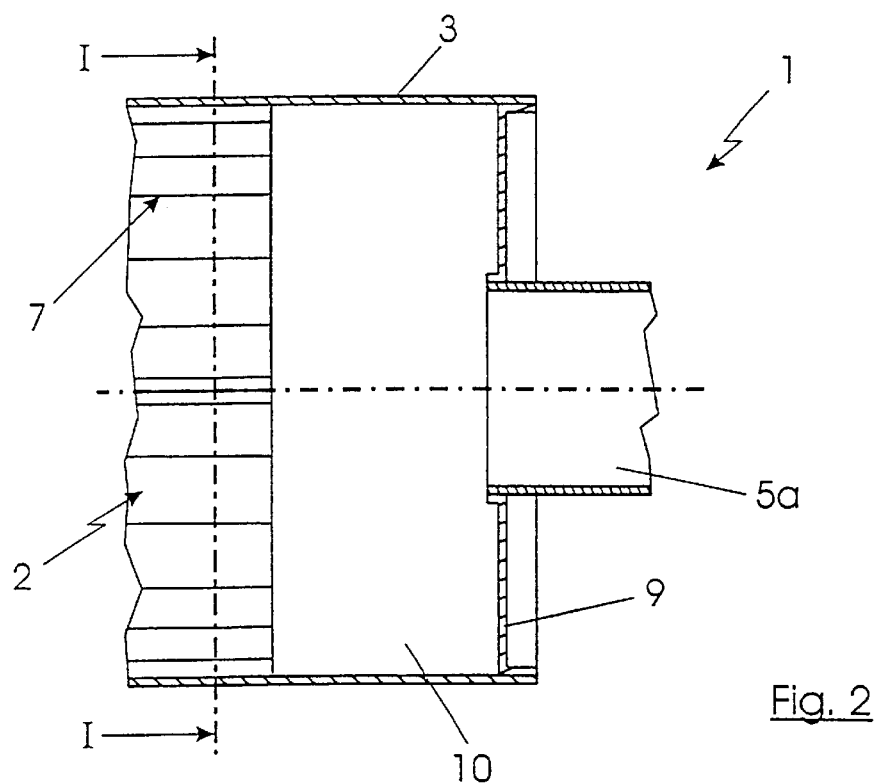
FIG. 2 shows a longitudinal section through the device according to the invention along line II—II in FIG. 1.

Represented in FIG. 2 is a cross section along the line II—II in FIG. 1. The outer container 3 in this case encloses the filter device 3 with its tine-like subregions 7. Fitted onto the end region represented of the outer container 3 is a metal terminating plate 9, which seals off the outer container and through which an end region 5a of the inner tube 5 extends. By contrast with the inner tube 5, this end region 5a of the inner tube 5 has no radial openings in the region within the filter device 2.

In the exemplary embodiment represented here, between the filter device 2 and the end region 5a of the inner tube 5 there lies a collecting plate 10, which provides a gastight transfer of the flowing fluid between the filter device and the end region of the inner tube 5.

Figure 3:
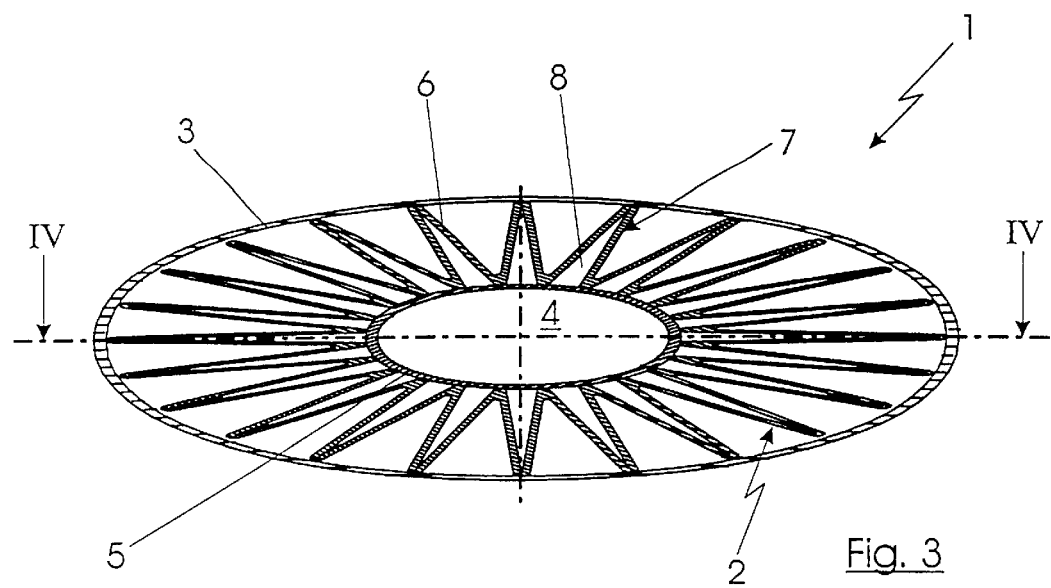
FIG. 3 shows a basic representation of a cross section through a further embodiment of the device according to the invention.

Represented in FIG. 3 is an alternative embodiment of the particle filter 1. It operates on the same functional principle and also has a comparable construction to the embodiment represented in FIG. 1. The only difference in comparison with FIG. 1 is that here the form of the outer container 3 does not have a round but an oval geometrical shape. The same applies in a comparable way to the inner tube 5 in the exemplary embodiment represented. However, it would also be quite conceivable to use a circular inner tube 5, even if the outer container 3 has an oval cross section.

The tine-like subregions 7 are arranged here by means of the folds in such a way that they each have a different radial extent from the inner tube 5 to the outer container 3. Consequently, the porous material 6 can be adapted by a simple alteration of the spacings between the individual folds in such a way that the filter device 2 is able to utilize as ideally as possible the space available between the inner tube 5 and the outer container 3.

Figure 4:
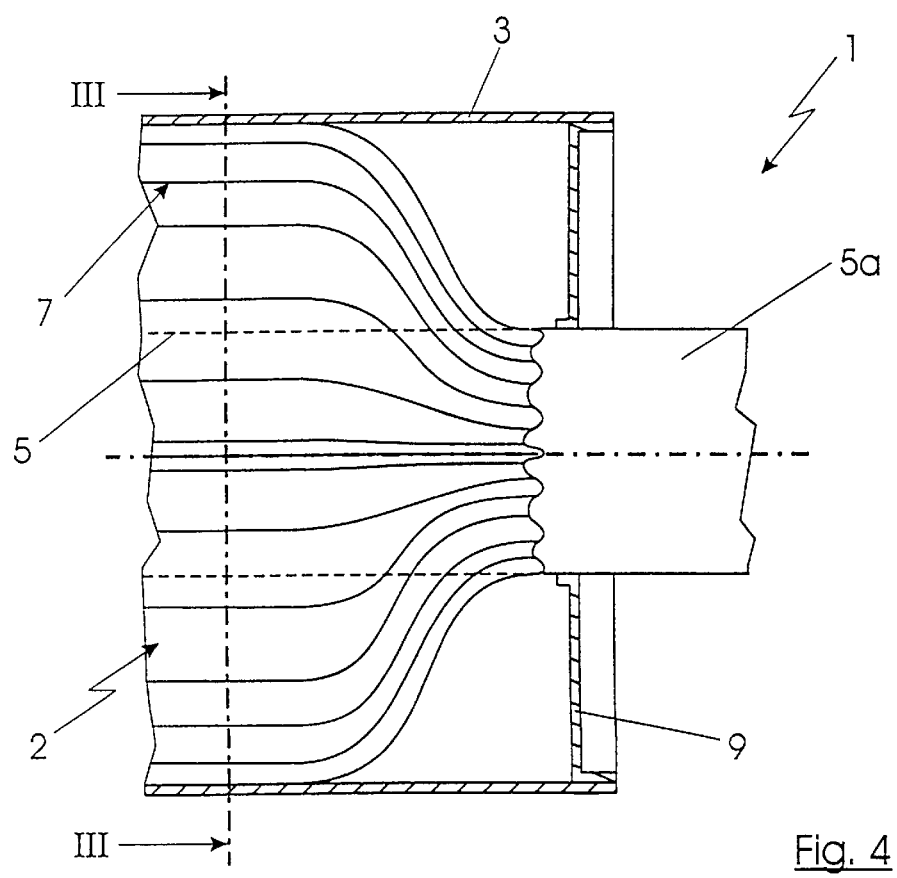
FIG. 4 shows a longitudinal section along the line IV—IV in FIG. 3.

Represented in FIG. 4 is a further possible way of joining the filter device 2 to the end region 5a of the inner tube 5. For this purpose, the porous material 6 of the filter device 2 is compressed around the end region 5a of the inner tube 5 and joined to the end region 5a of the inner tube 5 by adhesive bonding, soldering or welding.

In principle, the possibilities represented in FIGS. 2 and 4 can be used in every conceivable form and arrangement of the tine-like subregions 7 and of the outer container 3. An alternative possibility, which is not represented in the exemplary embodiments, may also dispense with the use of an inner tube, the compressed ends of the filter device 2 then also being able to be pressed from inside into a connecting piece of pipe, comparable with the, end region 5a of the inner tube 5, and welded or soldered or adhesively bonded.

The functional principle of the filter device 2 is approximately the same here in both directions of flow, so that the fluid contaminated with particles can on the one hand be introduced into the outer container 3 and discharged from the inner opening 4 of the filter device 2 or on the other hand can be introduced via the inner opening 4 and drawn out via the outer container 3. In principle, nothing about the way in which the particle filter 1 functions or is constructed changes as a result of the one or other direction of flow.

To realize the operating mode respectively desired, a connection between one end of the tube according to the embodiment explained in FIG. 4 may be provided on one side, for example, while at the other end the fluid is introduced or drawn out via a collecting plate 10 in such a way that the connecting pipe there is in connection with the space between the outer container 3 and the filter device 2.

Figure 5:
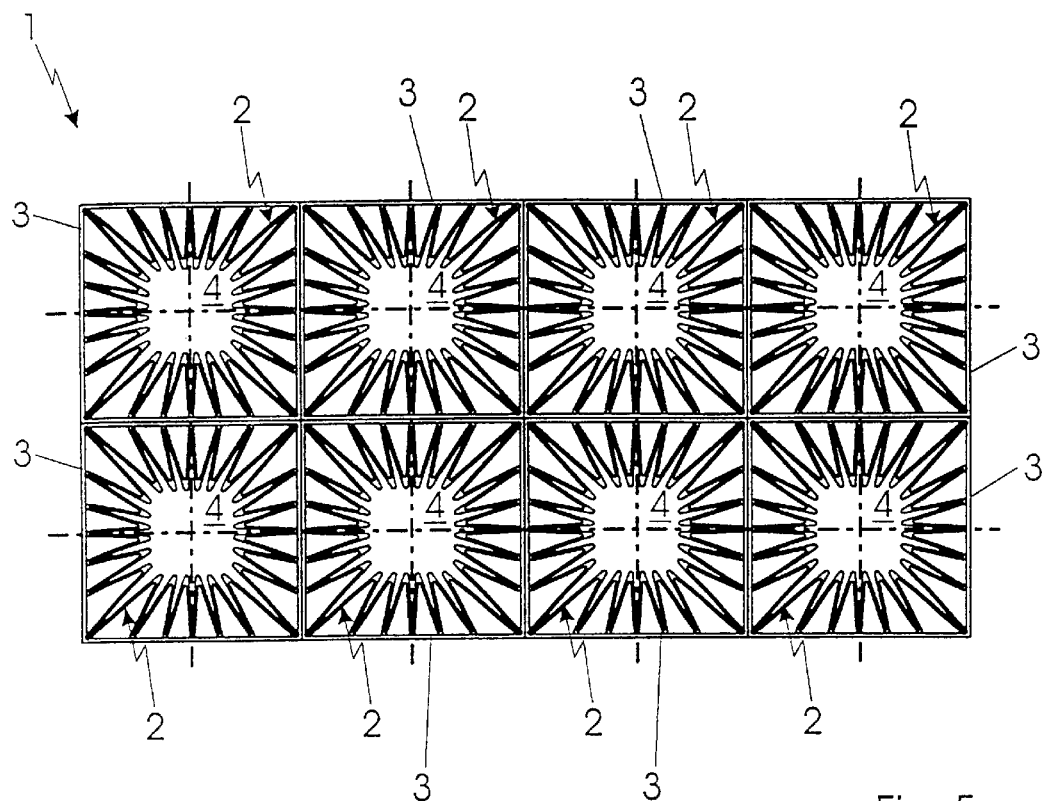
FIG. 5 shows a basic representation of a cross section through a further possible embodiment of the device according to the invention, with a combination of several filter devices.

FIG. 5 shows a further embodiment of the particle filters 1, eight filter devices 2 having been combined here to form a unit. The exemplary embodiment represented in FIG. 5 has dispensed with the use of inner tubes 5. This is possible if the sintered material 6 has an adequate wall thickness and strength to allow the filter device 2 to be designed as a self-supporting part. The square embodiment of the respective filter device 2 shows that the inner opening 4 may also be of any desired form, here likewise a square form.

Figure 6:
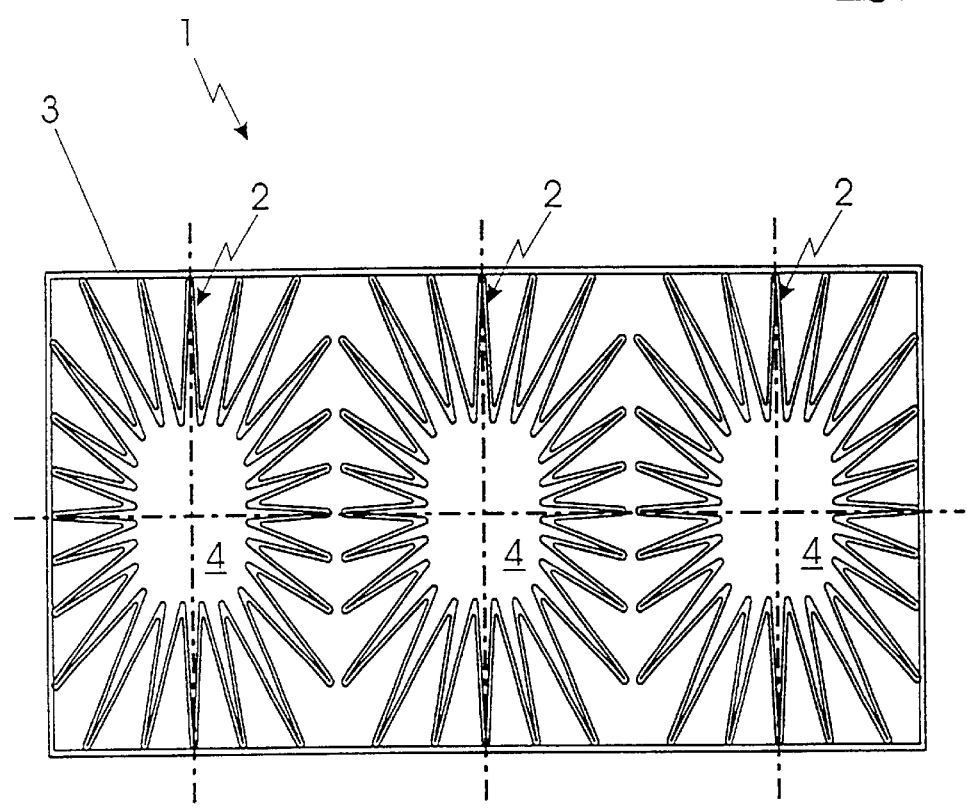
FIG. 6 shows a further alternative embodiment of the device according to the invention, with a combination of several filter devices.

FIG. 6 shows a further exemplary embodiment with a combination of three filter devices 2, which fill the greatest part of a respectively rectangular space, and are combined to form an overall unit. In comparison with the exemplary embodiment according to FIG. 5, it can be seen that each of the filter devices 2 does not have to have its own outer container 3, but that a number of filter devices can be combined in a single outer container 3.

Although the working, in particular bending, of sintered materials represents a production engineering challenge, with appropriate materials and techniques, such as preheating the points to be bent by means of laser technology for example, this is not in principle an insurmountable difficulty.

What is claimed is:

1. A device for filtering a fluid contaminated with particles, said fluid having a direction of flow, said device comprising:
    an outer container;
    at least one filter device constructed of porous material and disposed within said outer container, said porous material including a plurality of folds extending in the direction of flow, said porous material having a closed geometric form that defines an inner opening, wherein said outer container is disposed within an exhaust system of an engine and said at least one filter device forms a silencer in said exhaust system of said engine and wherein said porous material consists essentially of a sintered material.

2. The device according to claim 1, wherein said porous material of said at least one filter device includes a plurality of tine-like subregions opening in cross section towards said inner opening, said inner opening located along a longitudinal axis extending in the direction of flow, said plurality of tine-like subregions being separated from one another by one of said plurality of folds.

3. The device according to claim 2, further comprising a plurality of filter devices arranged with their respective longitudinal axes approximately parallel to one another in said outer container such that a space within said outer container is occupied by said filter devices.

4. The device according to claim 1, wherein said sintered material comprises metallic materials.

5. The device according to claim 1, wherein said inner opening has a supporting structure disposed therein, said supporting structure being permeable to the fluid and the particles.

6. The device according to claim 5, wherein said supporting structure has either a round or oval cross section.

7. The device according to claim 5, wherein said supporting structure comprises a metal perforated plate formed in a tube-like manner.

8. The device according to claim 1, wherein said filter device includes a terminating element disposed at a lengthwise end thereof.

9. The device according to claim 3, wherein outer regions between said tine-like subregions of each of said plurality of filter devices and the respective said outer container are converged together at a lengthwise end thereof and connected to either an outlet opening or an inlet opening of said outer container.

10. The device according to claim 5, wherein a plurality of tine-like subregions of said at least one filter device converge toward said supporting structure and a respective top of each of said plurality of tine-like subregions is connected with said supporting structure at a lengthwise end thereof.

11. A device for filtering a fluid contaminated with particles, said fluid having a direction of flow, said device comprising:

an outer container; and at least one filter device constructed of porous material and disposed within said outer container, said porous material including a plurality of folds extending in the direction of flow, said porous material having a closed geometric form that defines an inner opening and wherein said porous material of the at least one filter device includes a plurality of tine-like subregions opening in cross section towards said inner opening, said inner opening located along a longitudinal axis extending in the direction of flow, said plurality of tine-like subregions being separated from one another by one of said plurality of folds and wherein outer regions between said tine-like subregions and the outer container are converged together at a lengthwise end thereof and connected to either an outlet opening or an inlet opening of the outer container.

12. The device according to claim 11 wherein said outer container is disposed within an exhaust system of an engine and said at least one filter device forms a silencer in said exhaust system of said engine.

13. The device according to claim 12 wherein said porous material consists essentially of a sintered material.

14. The device according to claim 13 wherein said sintered material comprises metallic materials.

15. The device according to claim 11, wherein said inner opening has a supporting structure disposed therein, said supporting structure being permeable to the fluid and the particles.

16. The device according to claim 11, further comprising a plurality of filter devices arranged with their respective longitudinal axes approximately parallel to one another in said outer container and wherein outer regions between said tine-like subregions and the outer container of each of said plurality of filter devices are converged together at a lengthwise end thereof and connected to either an outlet opening or an inlet opening of the outer container.

17. A device for filtering a fluid contaminated with particles, said fluid having a direction of flow, said device comprising:

an outer container; and at least one filter device constructed of porous material and disposed within said outer container, said porous material including a plurality of folds extending in the direction of flow, said porous material having a closed geometric form that defines an inner opening and wherein said porous material of the at least one filter device includes a plurality of tine-like subregions opening in cross section towards said inner opening, said inner opening located along a longitudinal axis extending in the direction of flow and including a supporting structure disposed therein, said supporting structure being permeable to the fluid and the particles, said plurality of tine-like subregions being separated from one another by one of said plurality of folds and wherein said tine-like subregions converge toward said supporting structure and a respective top of each of said tine-like subregions is connected with said supporting structure at a lengthwise end thereof.

18. The device according to claim 17 wherein said outer container is disposed within an exhaust system of an engine and said at least one filter device forms a silencer in said exhaust system of said engine.

19. The device according to claim 18 wherein said porous material consists essentially of a sintered material.

20. The device according to claim 19 wherein said sintered material comprises metallic materials.

21. The device according to claim 17, wherein said supporting structure comprises a metal perforated plate formed in a tube-like manner.

22. The device according to claim 17, further comprising a plurality of filter devices arranged with their respective longitudinal axes approximately parallel to one another in said outer container and wherein said tine-like subregions of each of said plurality of filter devices converge toward said supporting structure and a respective top of each of said tine-like subregions is connected with said supporting structure at the lengthwise end thereof.

* * * * *